(12) United States Patent
Cunningham

(10) Patent No.: US 8,741,798 B2
(45) Date of Patent: Jun. 3, 2014

(54) CATALYSTS FOR HYDROCARBON OXIDATION

(76) Inventor: Emmett M. Cunningham, Phoenix, AZ (US)

( * ) Notice: Subject to any disclaimer, the term of this patent is extended or adjusted under 35 U.S.C. 154(b) by 737 days.

(21) Appl. No.: 12/472,691

(22) Filed: May 27, 2009

(65) Prior Publication Data

US 2009/0298674 A1    Dec. 3, 2009

Related U.S. Application Data

(60) Provisional application No. 61/056,936, filed on May 27, 2008.

(51) Int. Cl.
*B01J 31/00* (2006.01)
*B01J 23/60* (2006.01)
*B01J 23/40* (2006.01)

(52) U.S. Cl.
USPC ........... 502/113; 502/339; 502/172; 502/150; 502/326; 502/161

(58) Field of Classification Search
CPC .... C08F 10/00; C08F 4/65912; C08F 210/16; C08F 110/02; C08F 4/65916; B01J 23/40; B01J 23/44; B01J 23/42; B01D 2255/1021
USPC ................................. 502/102–104
See application file for complete search history.

(56) References Cited

U.S. PATENT DOCUMENTS

| | | | |
|---|---|---|---|
| 2,460,700 A | 2/1949 | Lyons | |
| 2,890,108 A | 6/1959 | Toulmin, Jr. | |
| 3,446,825 A | 5/1969 | Schultz | |
| 4,295,816 A | 10/1981 | Robinson | |
| 4,382,017 A | 5/1983 | Robinson et al. | |
| 4,475,483 A | 10/1984 | Robinson | |
| 4,665,268 A * | 5/1987 | Lee et al. | 585/640 |
| 4,802,335 A | 2/1989 | Bidwell | |
| 4,811,162 A * | 3/1989 | Maher et al. | 361/308.1 |
| 4,892,562 A | 1/1990 | Bowers et al. | |
| 4,897,473 A * | 1/1990 | Dombek | 536/97 |
| 5,034,020 A | 7/1991 | Epperly et al. | |
| 5,145,488 A | 9/1992 | Weber et al. | |
| 5,212,032 A * | 5/1993 | Wilson et al. | 430/65 |
| 5,331,924 A * | 7/1994 | Kraus | 123/1 A |
| 5,449,387 A | 9/1995 | Hawkins et al. | |
| 5,501,714 A | 3/1996 | Valentine et al. | |
| 5,693,106 A | 12/1997 | Peter-Hoblyn et al. | |
| 5,732,548 A | 3/1998 | Peter-Hoblyn | |
| 5,749,928 A | 5/1998 | Epperly et al. | |
| 6,139,723 A | 10/2000 | Pelrine et al. | |
| 6,169,055 B1 * | 1/2001 | Teng et al. | 502/243 |
| 6,197,366 B1 * | 3/2001 | Takamatsu | 427/125 |
| 6,776,606 B2 | 8/2004 | Haskew | |
| 7,169,196 B2 | 1/2007 | Wakefield | |
| 7,276,094 B2 | 10/2007 | Factor et al. | |
| 2001/0034299 A1 * | 10/2001 | Terry et al. | 502/117 |
| 2002/0045544 A1 * | 4/2002 | Le Peltier et al. | 502/325 |
| 2002/0183539 A1 * | 12/2002 | Shalyaev et al. | 558/270 |
| 2004/0011302 A1 * | 1/2004 | May | 123/1 A |
| 2004/0063567 A1 * | 4/2004 | Ginosar et al. | 502/34 |
| 2005/0044778 A1 * | 3/2005 | Orr | 44/320 |
| 2005/0054522 A1 | 3/2005 | Haskew | |
| 2005/0081430 A1 | 4/2005 | Carroll et al. | |
| 2006/0112906 A1 | 6/2006 | Cunningham et al. | |
| 2007/0134145 A1 | 6/2007 | Strehlau et al. | |
| 2008/0005958 A1 | 1/2008 | Factor et al. | |
| 2008/0277316 A1 | 11/2008 | Carter | |

FOREIGN PATENT DOCUMENTS

WO    2008141439 A1    11/2008

OTHER PUBLICATIONS

Alberto et al, Current Chemistry, 1996, 176, 149-187.*
Colquhoun et al Carbonylation, Plenum Press, 1991.*
Roger Alberto; High and Low Valency Organo metallic Compounds of Technetium and Rhenium.*
Acetylacetone Platinum(II) Salt TCI America.*
Acetylacetone Palladium(II) Salt TCI America.*
Palladium(II) acetylacetonate Chem Blink.*
Platinum bis(acetylacetonate) Chem Blink.*
Exxon COmpany USA Aromatic 150.*
PCT Application No. PCT/US 09/45257, Filed May 27, 2009, "Notification of Transmittal of International Search Report and the Written Opinion of the International Searching Authority, or the Declaration", dated Jul. 14, 2009.
PCT Application No. PCT/US 09/45257, Filed May 27, 2009, "Notification of Transmittal of International Preliminary Report on Patentability", dated Oct. 5, 2010, 11 pages.

* cited by examiner

*Primary Examiner* — Bijay Saha
(74) *Attorney, Agent, or Firm* — Stephen F. Swinton, Jr.; Hoffman Warnick LLC

(57) ABSTRACT

Embodiments of the invention provide catalysts for hydrocarbon oxidation. One embodiment of the invention provides a catalyst for hydrocarbon oxidation comprising: a liquid medium including aromatic hydrocarbon 150; bis(2,4-pentanedionato)platinum; bis(2,4-pentanedionato)palladium; ferrocene; magnesium 2-ethylhexanoate; and cerium (III) 2-ethylhexanoate, rhenium in an organo-metallic compound, or both.

16 Claims, No Drawings

CATALYSTS FOR HYDROCARBON OXIDATION

CROSS-REFERENCE TO RELATED APPLICATIONS

This application claims the benefit of U.S. Provisional Patent Application No. 61/056,396, filed 27 May 2008, which is hereby incorporated herein.

BACKGROUND

The oxidation of hydrocarbons represents one of the primary sources of energy, particularly in the field of transportation. Often, the oxidation of hydrocarbons results in undesirable byproducts and effects, such as the production of harmful emissions (including greenhouse gases, such as carbon dioxide). In addition, the oxidation of hydrocarbons to produce energy is, in many cases, inefficient. That is, a significant portion of the energy theoretically available in a hydrocarbon fuel is not realized, whether due to incomplete oxidation of the fuel, waste of such energy in the form of, for example, heat, etc.

SUMMARY OF THE INVENTION

Embodiments of the invention provide catalysts for hydrocarbon oxidation.

In one embodiment, the invention provides a catalyst for hydrocarbon oxidation comprising: a liquid medium; a platinum-containing compound; and a palladium-containing compound.

In another embodiment, the invention provides a catalyst for hydrocarbon oxidation comprising: a liquid medium including aromatic hydrocarbon 150; bis(2,4-pentanedionato)platinum; bis(2,4-pentanedionato)palladium; ferrocene; magnesium 2-ethylhexanoate; and cerium (III) 2-ethylhexanoate.

In yet another embodiment, the invention provides a catalyst for hydrocarbon oxidation comprising: a liquid medium including aromatic hydrocarbon 150; bis(2,4-pentanedionato)platinum; bis(2,4-pentanedionato)palladium; ferrocene; magnesium 2-ethylhexanoate; and rhenium in an organo-metallic compound.

DETAILED DESCRIPTION OF THE INVENTION

Catalysts according to embodiments of the invention include a liquid medium and one or more compounds containing an element from one or more of groups 1 (e.g., lithium), 2 (e.g., magnesium), 5 (e.g., cerium), 7 (e.g., rhenium), 8 (e.g., iron), and 10 (e.g., palladium, platinum) of the periodic table of the elements.

The liquid medium of catalysts of the invention may be aqueous, non-aqueous, or mixtures of either or both. For example, in various embodiments, the liquid medium may be water, a water/glycol mixture, an oil, an ester, and/or the like. Aqueous media preferably have a pH between about 2 and about 4.

Non-aqueous liquid media suitable for use in some embodiments of the invention include, for example, hydrocarbons (e.g., kerosene, octane, etc.), aromatic solvents (e.g., aromatic hydrocarbons, such as aromatic hydrocarbon 150 or aromatic hydrocarbon 200), and petroleum ether. Other suitable liquid media will be recognized by one skilled in the art, the above examples being provided for the purpose of illustration rather than limitation.

As noted above, catalysts according to embodiments of the invention include one or more compounds containing an element from one or more of groups 1, 2, 5, 7, 8, and 10 of the periodic table. In some embodiments, preferred elements and their respective ranges of concentration include palladium (about 100 to about 2000 ppm), platinum (about 100 to about 2000 ppm), cerium and/or rhenium (about 100 to about 10,000 ppm), iron (about 1000 to about 25,000 ppm), and magnesium (about 500 to about 10,000 ppm).

Elements from the groups above provide various beneficial characteristics to the catalysts of the various embodiments of the invention. For example, palladium, which is very stable at temperatures between about 300° C. and about 600° C., is beneficial as a catalyst during the ignition phase of hydrocarbon oxidation. Palladium-containing compounds useful in embodiments of the invention include, for example, bis(2,4-pentanedionato)palladium and acetylacetone palladium (II).

Platinum, which is more stable at higher temperatures (e.g., between about 600° C. and about 1200° C.), is beneficial during late-stage combustion. Platinum-containing compounds useful in embodiments of the invention include, for example, bis(2,4-pentanedionato)platinum and acetylacetone platinum (II).

Cerium and/or rhenium may function as catalyst boosters, enhancing the efficiencies of both palladium and platinum. Cerium- and rhenium-containing compounds useful in embodiments of the invention include, for example, salts of long-chain carboxylic acids, such as cerium (III) 2-ethylhexanoate and rhenium in an organo-metallic compound. Iron, which is stable across a broad temperature range, is effective at reducing particulate matter production during combustion as well as reducing the overall combustion temperature (as do palladium and platinum), thereby reducing nitrogen oxide and nitrogen dioxide production. Iron-containing compounds useful in embodiments of the invention include, for example, ferrocene and iron naphthenate.

In addition, iron and magnesium, when used in combination, exhibit complementary spectra lines covering the full frequency spectrum of the combustion electron configuration. These catalytic elements are capable of electron excitation that is not reduced by other catalysts. Magnesium-containing compounds useful in embodiments of the invention include, for example, salts of long-chain carboxylic acids, such as magnesium 2-ethylhexanoate.

Lithium may be used to stabilize the liquid medium in embodiments wherein the liquid medium contains water or a water/glycol mixture.

Provided below are illustrative examples of catalysts according to various embodiments of the invention. These examples are intended to be illustrative rather than limiting.

Example 1

One exemplary embodiment of the invention comprises: 1.0 kg aromatic hydrocarbon 150; 500 mg bis(2,4-pentanedionato)platinum; 1000 mg bis(2,4-pentanedionato)palladium; 4000 mg ferrocene; 1000 mg magnesium 2-ethylhexanoate; and 2000 mg cerium (III) 2-ethylhexanoate.

Example 2

Another exemplary embodiment of the invention comprises: 1.0 kg aromatic hydrocarbon 150; 500 mg bis(2,4-pentanedionato)platinum; 1000 mg bis(2,4-pentanedionato)palladium; 4000 mg ferrocene; 1000 mg magnesium 2-ethylhexanoate; and 2000 mg rhenium in an organo-metallic compound.

Example 3

Still another exemplary embodiment of the invention comprises: 1.0 kg aromatic hydrocarbon 150; 500 mg bis(2,4-pentanedionato)platinum; 1000 mg bis(2,4-pentanedionato) palladium; 4000 mg ferrocene; 1000 mg magnesium 2-ethylhexanoate; 1000 mg cerium (III) 2-ethylhexanoate; and 1000 mg rhenium in an organo-metallic compound.

In the illustrative examples above, one or more of the element-containing compounds may be dissolved or dispersed in a liquid carrier prior to its combination with other components of the catalyst. For example, bis(2,4-pentanedionato) platinum and bis(2,4-pentanedionato)palladium may be pre-dissolved in a solvent, such as 2-ethylhexanoic acid, and introduced as a liquid. Accordingly, the weight of any such pre-dissolved or pre-dispersed compound in the examples above includes the liquid carrier component. Nevertheless, the concentration ranges for the element contained in such a pre-dissolved or pre-dispersed compound would comport with those described above.

Catalysts according to various embodiments of the invention are capable of air-borne or fuel-borne delivery to an oxidation device (e.g., a combustion engine). Systems and methods for delivering catalysts, such as those of the invention, are known. Exemplary systems and methods are described in U.S. patent application Ser. No. 12/124,066, filed 20 May 2008, which is hereby incorporated herein as though fully set forth.

More specifically, in the case of air-borne delivery of a catalyst according to an embodiment of the invention, such catalyst may be injected or otherwise delivered directly to an oxidation device or apparatus (e.g., a flame zone of a combustion engine) or indirectly injected or delivered to such a device or apparatus (e.g., through an air intake to a flame zone of a combustion engine).

In other cases, catalysts according to embodiments of the invention may be pre-mixed with or added to a hydrocarbon fuel to be oxidized. For example, such catalysts may be added to a hydrocarbon fuel before the fuel is stored in a fuel tank. In other cases, such catalysts may be added to the hydrocarbon fuel once the fuel is in the fuel tank or at any point as the fuel is moved from the fuel tank to the flame zone (e.g., by adding a catalyst to a fuel line).

Catalysts and methods according to embodiments of the invention can provide one or more improvements to the oxidation of hydrocarbons, including, for example, more efficient oxidation, reduced temperatures (particularly in the cylinder and exhaust areas), a reduction in harmful emissions, increased engine horsepower, improved fuel economy, and reduced torsional vibration, resulting in reduced engine wear. Experimental oxidation of diesel fuel using catalysts according to various embodiments of the invention reduced overall fuel consumption by between about 10% and about 20%.

As used herein, the terms "more," "reduced," "increased," "improved," and similar terms are meant to refer to hydrocarbon oxidation not using catalysts of the invention.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A catalyst for hydrocarbon oxidation comprising:
   a liquid medium;
   bis(2,4-pentanedionato)platinum; and
   bis(2,4-pentanedionato)palladium,
   wherein the catalyst is capable of catalyzing oxidation of a hydrocarbon.

2. The catalyst of claim 1, wherein the liquid medium includes at least one of the following: an aromatic solvent, a hydrocarbon, and petroleum ether.

3. The catalyst of claim 2, wherein the hydrocarbon is selected from a group consisting of: kerosene and octane.

4. The catalyst of claim 1, further comprising:
   an iron-containing compound; and
   a magnesium-containing compound.

5. The catalyst of claim 4, wherein the iron-containing compound is selected from a group consisting of: ferrocene and iron naphthenate.

6. The catalyst of claim 4, wherein the iron-containing compound is ferrocene.

7. The catalyst of claim 4, wherein the magnesium-containing compound is a salt of a long-chain carboxylic acid.

8. The catalyst of claim 7, wherein the magnesium-containing compound is magnesium 2-ethylhexanoate.

9. The catalyst of claim 4, further comprising:
   a cerium-containing compound.

10. The catalyst of claim 4, wherein the cerium-containing compound is a salt of a long-chain carboxylic acid.

11. The catalyst of claim 10, wherein the cerium-containing compound is cerium (III) 2-ethylhexanoate.

12. The catalyst of claim 9, wherein:
    the iron-containing compound is ferrocene;
    the magnesium-containing compound is magnesium 2-ethylhexanoate; and
    the cerium-containing compound is cerium (III) 2-ethylhexanoate.

13. The catalyst of claim 9, further comprising:
    a rhenium-containing compound.

14. The catalyst of claim 13, wherein the rhenium-containing compound is a salt of a long-chain carboxylic acid.

15. The catalyst of claim 14, wherein the rhenium-containing compound is rhenium in an organo-metallic compound.

16. The catalyst of claim 13, wherein:
    the iron-containing compound is ferrocene;
    the magnesium-containing compound is magnesium 2-ethylhexanoate; and
    the rhenium-containing compound is rhenium in an organo-metallic compound.

\* \* \* \* \*